US009959816B2

(12) United States Patent
Payne et al.

(10) Patent No.: US 9,959,816 B2
(45) Date of Patent: *May 1, 2018

(54) FUEL DISPENSER

(71) Applicant: Gilbarco Inc., Greensboro, NC (US)

(72) Inventors: Edward A. Payne, Greensboro, NC (US); Rodger K. Williams, Siler City, NC (US); Ryan C. Garrett, Randleman, NC (US)

(73) Assignee: Gilbarco Inc., Greensboro, NC (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/797,772

(22) Filed: Jul. 13, 2015

(65) Prior Publication Data

US 2015/0317933 A1    Nov. 5, 2015

Related U.S. Application Data

(63) Continuation of application No. 13/098,977, filed on May 2, 2011, now Pat. No. 9,082,248.

(Continued)

(51) Int. Cl.
*G06F 3/02* (2006.01)
*G09G 3/34* (2006.01)
(Continued)

(52) U.S. Cl.
CPC ............. *G09G 3/344* (2013.01); *G06F 3/023* (2013.01); *G06F 3/0489* (2013.01);
(Continued)

(58) Field of Classification Search
CPC ......... G06F 3/147; G06F 3/1446; G09G 3/16; G09G 3/344; G09G 2300/0885; G09G 2300/0895; G07F 7/025; G07F 7/1033
(Continued)

(56) References Cited

U.S. PATENT DOCUMENTS 4,126,854 A     11/1978   Sheridon
5,459,776 A  *  10/1995   Di Santo ................. H04M 1/23
                                                           340/5.85

(Continued)

FOREIGN PATENT DOCUMENTS

CN        101633821 A       1/2010
EP          1923847 A1      5/2008
WO      2004001497 A1      12/2003

OTHER PUBLICATIONS

International Search Report and Written Opinion dated Jul. 8, 2011 in corresponding Patent Cooperation Treaty patent application No. PCT/US2011/034790, all enclosed pages cited.

(Continued)

*Primary Examiner* — Prabodh M Dharia
(74) *Attorney, Agent, or Firm* — Nelson Mullins Riley & Scarborough, LLP

(57) ABSTRACT

A system and method for displaying information at a fuel dispenser comprises an electrophoretic display that may be configured to operate in low temperature environments. The fuel dispenser may comprise a keypad located beneath the electrophoretic display in order to present a graphical user interface to a customer and receive the customer's selections. The fuel dispenser may comprise additional electrophoretic displays to present additional information to the consumer.

8 Claims, 12 Drawing Sheets

Related U.S. Application Data

(60) Provisional application No. 61/330,304, filed on Apr. 30, 2010, provisional application No. 61/348,146, filed on May 25, 2010.

(51) Int. Cl.
  *G06F 3/023* (2006.01)
  *G06F 3/0489* (2013.01)
  *G07F 7/10* (2006.01)
  *G07F 13/02* (2006.01)
  *G02F 1/167* (2006.01)

(52) U.S. Cl.
  CPC .......... *G07F 7/1033* (2013.01); *G07F 13/025* (2013.01); *G02F 1/167* (2013.01); *G09G 2310/068* (2013.01)

(58) Field of Classification Search
  USPC ..... 345/24, 33, 87, 107, 168–175, 204–211; 359/254, 296; 700/231, 236, 237, 244; 428/116
  See application file for complete search history.

(56) References Cited

U.S. PATENT DOCUMENTS

| | | | | |
|---|---|---|---|---|
| 5,724,067 A * | 3/1998 | Atchley | G09G 5/243 | 345/467 |
| 5,784,189 A * | 7/1998 | Bozler | G02B 26/02 | 359/230 |
| 5,945,975 A * | 8/1999 | Lundrigan | G09G 5/363 | 345/24 |
| 6,067,185 A | 5/2000 | Albert et al. | | |
| 6,120,588 A | 9/2000 | Jacobson | | |
| 6,152,591 A | 11/2000 | McCall et al. | | |
| 6,177,947 B1 * | 1/2001 | Wen | B41M 5/366 | 347/112 |
| 6,184,846 B1 * | 2/2001 | Myers | G07F 13/025 | 141/351 |
| 6,529,800 B1 * | 3/2003 | Johnson | G07F 13/025 | 222/52 |
| 6,899,151 B1 * | 5/2005 | Latka | B67D 7/348 | 141/392 |
| 7,109,969 B2 | 9/2006 | Zhou et al. | | |
| 7,289,877 B2 * | 10/2007 | Wilson | B67D 7/067 | 700/232 |
| 7,701,424 B2 * | 4/2010 | Karaki | G06F 1/10 | 345/206 |
| 7,982,715 B2 * | 7/2011 | Lawton | G06F 1/1626 | 341/22 |
| 8,099,140 B2 * | 1/2012 | Arai | G06Q 50/06 | 307/104 |
| 8,400,607 B2 | 3/2013 | Cappaert et al. | | |
| 2001/0037839 A1 * | 11/2001 | Litt | B67D 7/106 | 141/234 |
| 2002/0062174 A1 * | 5/2002 | Wilson | B67D 7/067 | 700/236 |
| 2002/0074344 A1 * | 6/2002 | Long | G07F 9/02 | 222/71 |
| 2002/0150827 A1 | 10/2002 | Kawai et al. | | |
| 2003/0004806 A1 | 1/2003 | Vaitekuuas | | |
| 2003/0053189 A1 * | 3/2003 | Goenaga | G02F 1/133348 | 359/296 |
| 2004/0259237 A1 * | 12/2004 | Kellogg | B01F 13/0064 | 435/287.1 |
| 2005/0134554 A1 * | 6/2005 | Albert | G02F 1/167 | 345/107 |
| 2005/0231460 A1 * | 10/2005 | Zhou | G02F 1/167 | 345/107 |
| 2006/0146027 A1 * | 7/2006 | Tracy | G06F 3/0238 | 345/168 |
| 2006/0182397 A1 * | 8/2006 | Benner | G02B 6/4212 | 385/89 |
| 2007/0081344 A1 * | 4/2007 | Cappaert | G02B 6/0085 | 362/373 |
| 2007/0285238 A1 * | 12/2007 | Batra | G01K 1/024 | 340/572.1 |
| 2008/0019502 A1 * | 1/2008 | Emmert | H04M 1/026 | 379/433.07 |
| 2008/0204855 A1 | 8/2008 | Yamamoto | | |
| 2009/0015407 A1 * | 1/2009 | Tuttle | G06K 19/07749 | 340/572.1 |
| 2009/0040594 A1 | 2/2009 | Albert et al. | | |
| 2009/0046052 A1 * | 2/2009 | Kim | G09G 3/344 | 345/107 |
| 2009/0048711 A1 * | 2/2009 | DeLine | B67D 7/08 | 700/237 |
| 2009/0195496 A1 * | 8/2009 | Koyama | G09G 5/003 | 345/107 |
| 2009/0237388 A1 * | 9/2009 | Seki | G06F 1/3228 | 345/211 |
| 2009/0254439 A1 * | 10/2009 | Dunn | G06F 3/0412 | 705/17 |
| 2009/0265638 A1 | 10/2009 | Carapelli et al. | | |
| 2010/0021683 A1 * | 1/2010 | Junghans | H05B 3/34 | 428/116 |
| 2010/0033539 A1 * | 2/2010 | Silverbrook | B41J 2/1404 | 347/61 |
| 2010/0141630 A1 * | 6/2010 | Kimura | G09G 3/3233 | 345/211 |
| 2010/0201700 A1 * | 8/2010 | Kusumoto | G09G 5/006 | 345/545 |
| 2010/0238106 A1 * | 9/2010 | Chang | G09G 3/344 | 345/107 |
| 2011/0109594 A1 * | 5/2011 | Marcus | G06F 3/04886 | 345/178 |
| 2011/0134044 A1 * | 6/2011 | Carapelli | G07F 9/02 | 345/168 |
| 2011/0148766 A1 * | 6/2011 | Huang | G06F 3/0202 | 345/168 |
| 2012/0012382 A1 * | 1/2012 | McBain | B32B 38/00 | 174/388 |
| 2014/0131386 A1 * | 5/2014 | Zuzek | B67D 7/84 | 222/173 |
| 2015/0253487 A1 * | 9/2015 | Nichol | G02B 6/0036 | 362/610 |

OTHER PUBLICATIONS

First Office Action dated Jun. 4, 2014 in corresponding Chinese patent application No. 201180030476.4, all enclosed pages cited.
Extended European Search Report dated Feb. 5, 2015 in corresponding European patent application No. 11775700.5, all enclosed pages cited.
Second Office Action dated Jan. 30, 2015 in corresponding Chinese patent application No. 201180030476.4, all enclosed pages cited.
European Examination Report dated Sep. 22, 2015 in corresponding European patent application No. 11775700.5, all enclosed pages cited.
Extended European Search Report dated May 11, 2016 in corresponding European patent application No. 16162606.4, all enclosed pages cited.
Third Office Action dated Oct. 20, 2015 in corresponding Chinese patent application No. 201180030476.4, all enclosed pages cited.
Fourth Office Action dated Jul. 6, 2016 in corresponding Chinese patent application No. 201180030476.4, all enclosed pages cited.
Fifth Office Action dated Mar. 30, 2017 in corresponding Chinese patent application No. 201180030476.4, all enclosed pages cited.
Examination Report dated Mar. 7, 2018 in corresponding European patent application serial No. 16162606.4, all enclosed pages cited.

* cited by examiner

FUEL DISPENSER

CROSS-REFERENCE TO RELATED APPLICATIONS

This application is a continuation of U.S. patent application Ser. No. 13/098,977 filed on May 2, 2011, entitled "Fuel Dispenser" which claims the benefit of U.S. patent application Ser. No. 61/330,304 filed on Apr. 30, 2010, and U.S. patent application No. 61/348,146 filed on May 25, 2010, both entitled "User Interface for a Fuel Dispenser." The entire disclosure of the foregoing applications is hereby incorporated by reference as if set forth verbatim herein and relied upon for all purposes.

FIELD OF THE INVENTION

The present invention relates generally to fuel dispensers and, more specifically, to user interfaces for fuel dispensers.

BACKGROUND OF THE INVENTION

Fuel dispensers in retail fueling environments include displays to provide information to the consumer, as well as to the station's operator, such as total amount of fuel dispensed and price-per-gallon for different grades of fuel. Background information and examples of fuel dispensers and retail fueling environments are provided in U.S. Pat. No. 6,453,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), and U.S. Pat. No. 6,935,191 (entitled "Fuel Dispenser Fuel Flow Meter Device, System and Method"), the entire disclosure of each of which is hereby incorporated by reference for all purposes as if set forth verbatim herein.

Regulatory requirements often mandate that fuel dispensers be separated from enclosed buildings by a predefined distance. The requirements also generally necessitate that the dispensers remain free from atmospheric confinement to allow any fuel vapors to disperse. As a result, fuel dispensers and their displays are typically freestanding and often located in a manner that exposes them to direct sunlight. For the same reasons, dispensers may additionally be exposed to environmental extremes, such as severe high and low temperatures. In certain scenarios, for example, the dispensers may be subject to an industry-accepted benchmark of extreme low temperatures of approximately negative forty degrees Fahrenheit (−40° F.).

Moreover, several requirements related to fueling transactions necessitate that certain information be conveyed to a consumer during the transaction. This information may include the cost per unit of volume, the total volume, and/or the total cost of the fuel being dispensed. This information is generally financial in nature and related to a sale that is in progress, completed, or has been interrupted. As such, the weights and measures authority for the relevant jurisdiction typically mandates that the information remain readable for a minimum specified amount of time. One reason for this is to preserve the information in order to complete the transaction manually without dispute in the event of a power failure.

Fuel dispensers use various display technologies to convey the information to consumers during the fueling transaction, examples of which include mechanical, electromechanical segmented vane ("vane"), incandescent segmented filament ("filament"), heated cathode vacuum fluorescent ("fluorescent"), cold cathode gas discharge ("cathode"), light emitting diode ("LED"), and liquid crystal. There are generally two types of liquid crystal displays ("LCDs"): reflective and transmissive. Use of each type of display technology, however, is not without drawbacks.

Mechanical and vane displays suffer in reliability due to the number of moving parts required. Additional precision is accompanied by additional mechanical complexity and increased costs. The display's rate of computation is limited by friction, inertial mass, and other constraints attendant with physically moving parts.

Filament, fluorescent, and cathode displays require significant electrical power. For the same reason, maintaining display information during power loss requires a disproportionally large battery, capacitor(s), or other power supply. Filament displays suffer progressive degradation modes including filament sagging, oxidation, and sputtering, as well as absolute failure modes. Fluorescent displays degrade in their light output intensity over time as both cathode emissivity and phosphor anode efficiencies degrade. Cathode displays degrade in their light output intensity over time by both electrode sputtering and cathode poisoning. As a result, the ability to use a display of these types is reduced or eliminated over time.

LED displays exhibit poor readability in sunlight and also require disproportionally large batteries to maintain display information during power loss. Due to their construction, LCDs attenuate total light throughput, which is worsened in the case of reflective-type LCDs due to the use of a reflector. Transmissive-type LCDs require a sufficient amount of rearward/backlighting in order to overcome direct sunlight exposure, as well as the above-mentioned attenuation, thereby increasing the electrical power required while reducing the useful life of the backlighting technology employed. As a result, the reliability of transmissive-type LCDs depends, at least in part, upon the source of the backlighting. A battery or other power source is required to maintain the backlighting during a power failure.

Fuel dispensers typically also include an input device to receive information from consumers, such as a keypad. The fuel dispenser's keypad and display may be replaced by a touchscreen which performs the functions of both the keypad and display. Depending on the technology used, incorporation of displays and touchscreens increases the initial cost of the dispenser, as well as maintenance and repair costs. Additionally, each type of display described above requires a constant source of energy in order to operate, thereby increasing each dispenser's operational costs. Also for this reason, they are unable to display or provide any information in the absence of power. This is aggravated in certain areas where the supply of electric power is inconsistent or unreliable. Additional devices, such as capacitors, generators, and battery backups, may be used to continuously provide power to the displays in the event of a power failure, but installation, use, and maintenance of these devices also increases costs.

Electrophoretic displays are informational displays that form visible images by rearranging charged pigment particles using an applied electric field. The electric field manipulates the electric charge exhibited by the particles so that the particles either migrate to the surface of the display or rest near the rear of the display. As a result, an image is created and presented on the display. The electrophoretic display continues to display the image even after the electric field is withdrawn until another electric field is applied to the display in order to rearrange the particles.

Physical transformations and behaviors occur in electrophoretic displays, however, when operating at low temperatures. For instance, the pigmented particles may undergo glassification even at temperatures that are above the industry-accepted minimum operating temperature of −40° F. The particles may be suspended in a dispersant, such as a hydrocarbon or siloxane, the dynamic viscosity of which is a function of temperature. As dynamic viscosity increases with decreasing temperature, the response time or "refresh rate" of the display becomes greater than the change in the information being displayed. Thus, the electrophoretic display is unable to present the information at the same speed that it is received.

SUMMARY OF THE INVENTION

The present invention recognizes and addresses the foregoing considerations, and others, of prior art construction and methods.

One aspect of the present invention provides a fuel dispenser comprising a meter, a processing device operatively connected to the meter, and an electrophoretic display. The meter is configured to measure a flow of fuel, and the electrophoretic display is positioned on the fuel dispenser and configured to display an image based on data transmitted by the processing device corresponding to the flow of fuel measured by the meter.

Another aspect of the present invention provides a method whereby cold temperature effects upon electrophoretic mobility and other first and/or higher order transformations and/or behaviors relating to electrophoretic display technology are ameliorated, thereby facilitating their use within fuel dispensers exposed to environmental extremes.

Another aspect of the present invention provides a manufacturing method and system for implementing an electrophoretic display within a fuel dispenser. The fuel dispenser comprises at least one dielectric or otherwise electrically insulative printed circuit board ("PCB") that physically supports and electrically interconnects the components mounted thereon. The PCB may physically secure or electrically interconnect the components via etched laminate and/or plated metallization elements. At least one thermal metallization element further serves to receive, store, distribute, and/or convey heat energy. The thermal metallization element may be of any useful shape or structure as to facilitate storage of heat energy and/or to limit heat loss.

In another embodiment, multiple thermal metallization elements may be stacked or layered in planes upon and/or within the PCB to facilitate storage of heat energy. Perpendicular and/or tangential structures including apertures, holes, or "vias" may also be used for the thermal interconnection of the thermal metallization elements. The vias may be metallized or otherwise made thermally conductive. Each thermal metallization element may also serve as a path to convey electrical current, possess electrical potential but not convey electrical current, be electrically isolated, or be electrically inert.

In another embodiment, the fuel dispenser comprises at least one component device for generating heat energy, preferably by conversion from electrical energy. The component device is bonded or is proximate to the thermal metallization elements so that the heat energy generated is largely coupled and transferred to the thermal metallization elements.

In another embodiment, the fuel dispenser may also comprise at least one component device configured to measure the heat energy generated (and/or is latently available as a thermostat) in order to assist in the control and/or modulation of the component device(s) configured to generate heat energy. If present, the device(s) measuring heat energy may be bonded or located proximate to the thermal metallization elements that are common to the heat generation component device(s) in order to facilitate measurement of the heat generated. This embodiment may include at least one electrophoretic display in proximate or direct contact with the PCB and may also include an adhesive that bonds the electrophoretic display to the PCB. The adhesive may be intrinsically thermally conductive and/or physically and/or chemically modified to improve thermal conductivity.

Electrical interconnectivity between the electrophoretic display and the associated electrical conductors on the PCB may be accomplished by conventional methods, such as via at least one connector, by metallurgic methods, such as reflow soldering, and/or by a conductive adhesive. The conductive adhesive may be applied in order to facilitate electrical interconnection between the electrophoretic display and the PCB and/or may be electrically anisotropic in one or more favored axis, and thus applied more generally in scope.

In another embodiment, the fuel dispenser may include at least one thermal isolation barrier achieved by removal of the PCB's substrate material adjacent or proximate to the thermal metallization elements. This reduces propagation of thermal energy stored within the thermal metallization elements to surrounding substrate elements or other non-useful and/or dissipative thermal sinks. The fuel dispenser may also comprise at least one thermal insulation barrier achieved by covering the thermal metallization elements otherwise exposed to ambient space and/or air circulative currents in such manner to reduce propagation of the thermal energy stored within the thermal metallization elements to ambient losses via radiation and/or convection.

Portions of the electrophoretic display may likewise be exposed to ambient space and/or air circulative currents. In one embodiment, the fuel dispenser may comprise at least one optically transparent thermal insulation barrier achieved by either partially or fully covering or ensconcing these portions of the electrophoretic display device. As a result, the thermal energy potential of the electrophoretic display has reduced thermal energy losses via radiation and/or convection. The optically transparent thermal insulation barrier may be of a material, construction, additive, and/or dye such that attenuation occurs within the infrared portion of the optical spectrum. The optically transparent thermal insulation barrier may also be constructed to function as a light pipe, capturing ambient and/or artificial light and redirecting the light in order to illuminate the electrophoretic display in addition to any illumination occurring largely orthogonal to optical transmissivity.

The electrical interconnections between the electrophoretic display and associated electrical conductors on the PCB may also be accomplished by an electrically anisotropic gasket or membrane, either fully anisotropic in area, or limitedly anisotropic in specific area or areas where electrical interconnectivity is required. The gasket or membrane may also be intrinsically thermally conductive and/or physically and/or chemically modified to improve thermal conductivity. The gasket or membrane may also comprise an adhesive bonding area or areas, selectively or generally applied, to bond to either the electrophoretic display, the PCB, or both. Alternately, a physical retaining device selectively or generally applying force normal to the electrophoretic display, thereby compressing the display against the gasket or membrane, and from there compressing the gasket or membrane against the PCB, may be utilized. In one embodiment the optically transparent thermal insulation barrier may also serve as the physical retaining device.

Another aspect of the present invention provides a fuel dispenser comprising a processing device, a keypad, and an electrophoretic display. The keypad is located on the fuel dispenser, is operatively connected to the processing device, comprises a number of keys, and is configured to transmit data to the processing device identifying when one of the keys is selected. The electrophoretic display is juxtaposed to the keypad and operatively connected to the processing device. The display is configured to display a graphical user interface ("GUI"), which includes at least one selectable option, based on data transmitted by the processing device. At least one of the keys corresponds to the option, and the processing device is configured to determine that the option has been selected based on data transmitted by the keypad.

Yet another aspect of the present invention provides a fuel dispenser comprising a signboard area adjacent a top surface of the fuel dispenser and an electrophoretic display positioned over at least a portion of the signboard area. The electrophoretic display is configured to display an image based on data transmitted by a processing device operatively connected to the electrophoretic display.

A further aspect of the present invention provides a method for displaying information at a fuel dispenser comprising an electrophoretic display and a processing device operatively connected to the electrophoretic display. The method includes the steps of receiving data corresponding to the information at the fuel dispenser, transmitting at least a portion of the data by the processing device, applying at least one electric field to the electrophoretic display based on the portion of the data transmitted by the processing device, and displaying by the electrophoretic display an image as a result of the application of the electric field.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
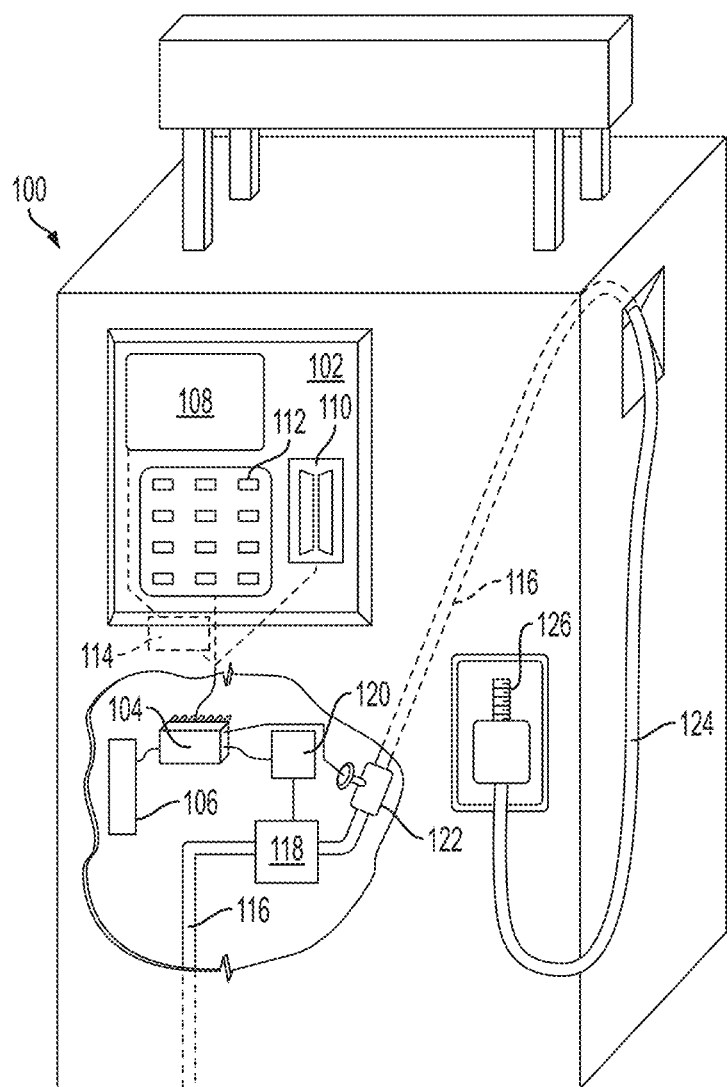
FIG. 1 is a partially schematic perspective view of a fuel dispenser in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

For purposes of explanation with respect to the accompanying figures, various electrical interconnection vias, pads, surfaces, and other elements of the printed circuit boards ("PCBs") are depicted as electrically and/or thermally isolated within the accompanying figures for illustrative simplicity and clarity. It should be understood, however, that such depictions do not infer isolation or preclude interconnection with other vias, pads, surfaces, and elements.

For purposes of the ensuing description, the term "metallization" typically refers to and implies a metal, metals, or alloy of metals. In fact, raw PCB material typically comprises at least one laminated plane of copper that is bonded to at least one dielectric substrate whereby unwanted regions of copper are chemically removed (etched) to produce desired interconnections. Therefore, the use of copper, which possesses both good electrical and thermal conductivity, is the most common and thus likely most cost effective method for fabrication and production of certain embodiments of the present invention described herein. However, for purposes of the ensuing description, the term "metallization" is not intended to be limiting, or specifically limited to a metal, metals, or alloys of metals. In fact, it may refer to an oxide or oxides of a metal or metals, a ceramic, polymer or polymers, a substance, or a composite of substances. For example, the oxides of tin and indium, while no longer considered base metals being bonded with oxygen, nevertheless exhibit both electrical and thermal conductivity, and may be and in fact frequently are deposited or sputtered onto a dielectric substrate to produce desired interconnections. For the case of thermal metallization, which may forgo the need for concomitant electrical conductivity, the possibilities for substitution broaden, and similarly the term "metallization" is not intended to be limiting for such a scenario. For example, siloxane, beryllium oxide, and aluminum nitride are thermally but not electrically conductive.

FIG. 1 is a partially schematic, perspective view of a fuel dispenser 100 comprising a user interface 102, a processing device 104, and memory 106. User interface 102 includes an electrophoretic display 108, a card reader 110, and a numeric pad 112. Processing device 104 is operatively connected to memory 106, as well as the components of user interface 102, such as card reader 110 and numeric pad 112. Processing device 104 is operatively connected to electrophoretic display 108 via an electric source 114. User interface 102 may comprise other components operatively connected to processing device 104, such as a smart card reader, a cash acceptor, and/or a receipt printer, as should be understood by those skilled in the art.

As should also be understood by those skilled in the art, fuel dispenser 100 further includes various components configured to facilitate the delivery of fuel to a vehicle. For instance, fuel dispenser 100 additionally comprises a piping network 116 in fluid communication with at least one underground storage tank ("UST"), a meter 118, a pulser 120, a valve 122, a hose 124, and a nozzle 126. Processing device 104 is operatively connected to one or more of these components, such as pulser 120 and valve 122, in order to control their operation and/or to manage the delivery of fuel by fuel dispenser 100.

Processing device 104 may be a processor, microprocessor, controller, microcontroller, or other appropriate circuitry. For example, multiple electronic devices configured to operate together or separately within fuel dispenser 100 may be considered a "processing device." Memory 106 may be any type of memory or computer-readable medium that is capable of being accessed by processing device 104. For instance, memory 106 may be random access memory ("RAM"), read-only memory ("ROM"), erasable programmable ROM ("EPROM") or electrically EPROM ("EEPROM"), CD-ROM, DVD, or other optical disk storage, solid state drive ("SSD"), magnetic disk storage, including floppy or hard drives, any type of non-volatile memories, such as secure digital ("SD"), flash memory, memory stick, or any other medium that may be used to carry or store computer program code in the form of computer-executable programs, instructions, or data. Processing device 104 may also include a portion of memory accessible only to the processing device, commonly referred to as "cache." Thus, memory 106 may be part of processing device 104, may be separate, or may be split between the relevant processing device and a separate memory device.

Memory 106 comprises computer-executable program code or instructions that, when executed by processing device 104, perform at least a portion of the processes described in more detail below. Memory 106 may also comprise one or more data structures for storing information, such as a database or a table. The computer-executable program code or instructions in this scenario, as should be known to those skilled in the art, usually include one or more application programs, other program modules, program data, firmware, and/or an operating system.

In the presently-described embodiment, processing device 104 is configured to transmit data from memory 106 to electric source 114 representative of material to be presented to a consumer via electrophoretic display 108. It should be understood that the data transmitted may be representative of any information or material, including text, images, and/or graphics. Thus, the material to be displayed is referred to collectively as an image that is presented by electrophoretic display 108 for purposes of the ensuing explanation. It should be further understood, however, that the data transmitted by processing device 104 may correspond to a plurality of images or a video to be presented by electrophoretic display 108. As explained above, for instance, display 108 may be configured to present information to a consumer regarding the fueling transaction in which the consumer is currently involved. This information may include the cost per unit of volume of the type of fuel selected, the total volume of fuel dispensed, and the total cost of the dispensed fuel, as explained in more detail below with respect to FIGS. 2 through 7. The information presented by display 108 may also include various other material, such as graphical user interfaces ("GUIs"), instructions, queries, advertisements, etc., examples of which are described below with respect to FIGS. 10A through 12.

Electrophoretic display 108 comprises charged particles located between two plates that are relatively close to one another in proximity. Electric source 114 is configured to construct and then apply an electric field across the plates, thereby causing the pigment in the particles to be attracted to one plate or the other. As a result, the display presents an image due to the combination of the particles attracted to one plate. That is, light is either reflected or absorbed by each particle depending on its orientation, thereby presenting an image on the display. Electric source 114 is configured to create and apply the electric field(s) based on the data received by the electric source from processing device 104.

Electric source 114 is further configured to construct and then apply electric fields to the particles in order to create and display multiple images or a video when the received data corresponds to such. In one embodiment, the data received by electric source 114 includes information as to whether the images should be displayed sequentially, such as in an animation, or whether a predefined amount of time should be included between the presentation of each image. For instance, the images may correspond to a cycle of advertisements, where the cycle includes a predetermined amount of time to present each advertisement before displaying a subsequent advertisement. It should be further understood that the data received by electric source 114 may indicate that only a portion of electrophoretic display 108 should present the image or that only a specific portion of the display should be updated with the image. That is, electrophoretic display 108 may be sectioned into multiple portions, such that an electric charge applied to the display's particles only updates or alters a specific portion as identified in the corresponding data received by electric source 114.

While the following explanation may describe data as being transmitted to electrophoretic display 108, it should be understood from the above description that the data is transmitted to electric source 114, which constructs and applies the electric fields to the display based on the data. Additionally, the image displayed by electrophoretic display 108 may be referred to as being displayed by dispenser 100. Those skilled in the art should appreciate that electric source 114 may be a component of electrophoretic display 108 rather than a separate device as illustrated in FIG. 1. It should also be understood that either color or monochrome electrophoretic displays may be used in the embodiments described herein without departing from the scope of the present invention. Examples of suitable devices that may be used as electrophoretic display 108 and electric source 114 include the ACTIVE MATRIX, SEGMENTED, and METRONOME displays offered by E Ink Corporation of Cambridge, Mass.

User interface 102 may be configured to facilitate the dispensing of fuel and the acceptance of payment for the dispensed fuel, as well as to provide other information to customers. For instance, electrophoretic display 108 is configured to provide instructions to a customer regarding the fueling process, while card reader 110 and numeric pad 112 are configured to accept payment card information provided by the customer. That is, card reader 110 is configured to receive payment card data from a magnetic stripe card, such as a credit or debit card, that is swiped or inserted into the card reader. Numeric pad 112 is configured to receive information from a customer associated with the swiped card, such as a personal identification number ("PIN") of a debit card or the billing postal (zip) code of a credit card. If included within user interface 102, other devices are configured to facilitate financial transactions for payment of the dispensed fuel. For instance, the smart card reader is configured to handle transactions involving the use of smart cards, while the cash acceptor is configured to handle transactions involving cash payments. The receipt printer is configured to print a receipt upon completion of a fueling process. Processing device 104 is configured to handle the communication and processing of all data transmitted to and received from the components of user interface 102.

Data representative of images to be presented by electrophoretic display 108 may be stored in memory 106 until needed, at which point processing device 104 transmits the data to electric source 114. The images may be presented by electrophoretic display 108 multiple times, such as the instruction screen described above, and may therefore be retained within memory 106.

In operation, a customer positions his vehicle adjacent to fuel dispenser 100 to initiate the fueling process. Electrophoretic display 108 presents instructions to the customer as to the manner by which to begin the process, which may instruct the customer to swipe a credit or debit card using card reader 110. That is, processing device 104 retrieves data from memory 106 representative of an image presenting the instructions and transmits the data to electric source 114. Based on the received data, electric source 114 calculates and applies the electric fields to the particles of electrophoretic display 108 in order to present the image providing the instructions.

In this example, the customer swipes a debit card using card reader 110 and provides his PIN to dispenser 100 using numeric keypad 112. In order to determine whether to authorize the fueling process, fuel dispenser 100 transmits at least a portion of the payment card data received from the customer to a server maintained by a financial institution corresponding to the card provided by the customer. Data representative of whether the financial institution authorizes the transaction is returned to dispenser 100, as should be understood by those skilled in the art.

If fuel dispenser 100 receives an authorization, processing device 104 instructs valve 122 to open in order to allow the flow of fuel. When the customer activates nozzle 126 and valve 122 is open, fuel flows from at least one UST to piping network 116. Meter 118 measures the flow of fuel as it flows through the meter, while pulser 120 transmits a signal to processing device 104 representative of the measurement. Processing device 104 maintains data corresponding to the fueling process, such as the total volume of fuel dispensed and the total amount corresponding to the dispensed fuel, in memory 106, as should be understood by those skilled in the art.

In the presently-described embodiment, processing device 104 transmits data to electric source 114 representative of the totals maintained by the processing device corresponding to the fueling process. Electric source 114 causes electrophoretic display 108 to present the totals on at least a portion of the display in a manner similar to that described above. That is, electrophoretic display 108 presents the running totals corresponding to the present fueling process on at least a portion of the display as described in more detail below with respect to FIGS. 2 through 7. As the totals are updated by processing device 104, electric source 114 applies at least one electric field to electrophoretic display 108 to update the image displayed thereon to reflect the updated totals.

Upon completion of the fueling process, fuel dispenser 100 transmits data to the financial institution corresponding to the completed fueling process in order to complete the transaction. The financial institution performs any necessary tasks which may include debiting the customer's account, as is well-known in the art. Additionally, fuel dispenser 100 may complete any ancillary tasks associated with the fueling process, such as printing a receipt for the customer if desired. The image presented by electrophoretic display 108 after completion of the fueling process includes the final values, such as a total volume of fuel dispensed and a total currency (e.g., dollar) amount corresponding to the dispensed fuel.

As should be understood, an image displayed by an electrophoretic display will remain on the display until another charged field is applied to the display. Accordingly, an image presented by electrophoretic display 108 remains on the display even if power is removed from dispenser 100 and/or electric source 114. For instance, in the embodiment described above where electrophoretic display 108 is instructed to present an image comprising the total amount of fuel dispensed and/or the total currency (e.g., dollar) amount of the dispensed fuel, the image remains displayed after a user has completed the refueling process, even in the event of a power failure. Thus, information that may be required by the fuel station's operator may be obtained even in the event that dispenser 100 and/or electrophoretic display 108 (via electric source 114) lose power.

Alternatively, because electrophoretic displays require much less power to operate in comparison to displays incorporating other technology, a small, inexpensive battery may be operatively connected to electric source 114. The relatively small battery is configured to provide power to electric source 114 and/or electrophoretic display 108 in the event of a power failure.

Processing device 104 may be configured to receive other information to be presented by electrophoretic display 108, such as fuel temperature, a running sales total for the respective fuel dispenser, or any other relevant data from devices located in the fueling environment configured to monitor a component thereof and output data corresponding to the component. Processing device 104 is configured to transmit at least a portion of this data to electric source 114 in order for an image corresponding to the data to be presented by electrophoretic display 108.

Figure 2:
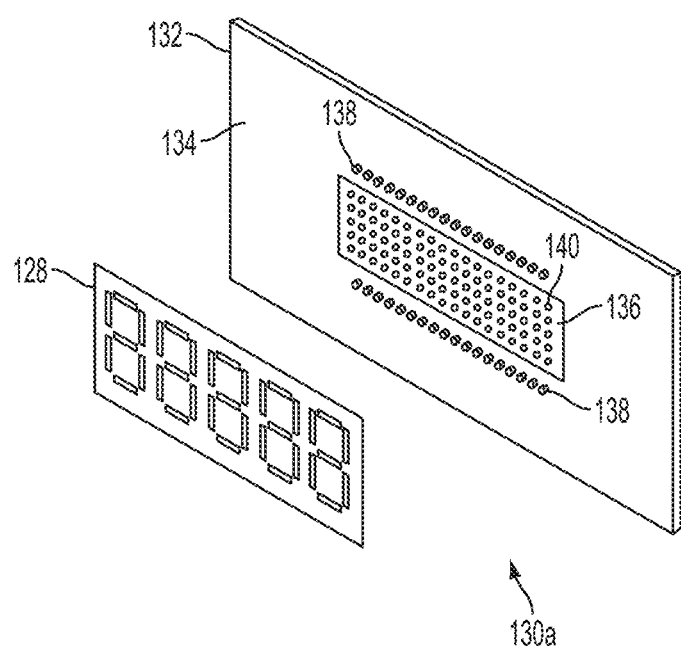
FIG. 2 is an exploded front perspective view of a fuel dispenser display system in accordance with an embodiment of the present invention.
Figure 3:
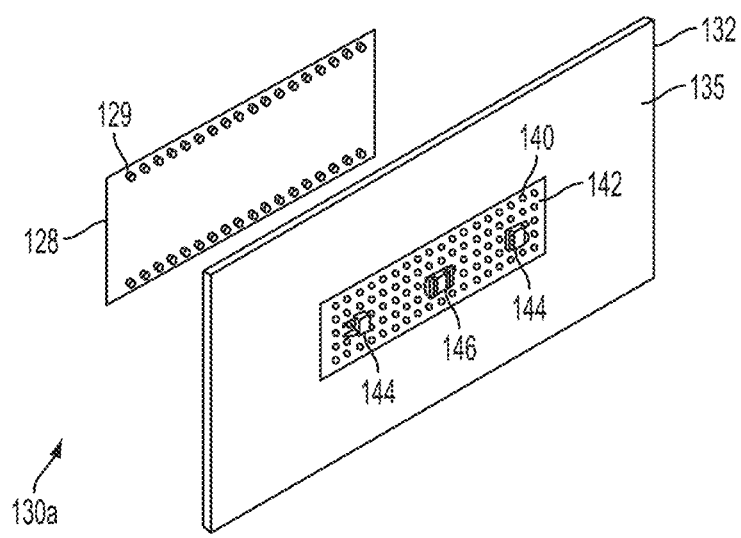
FIG. 3 is an exploded rear perspective view of the fuel dispenser display system of FIG. 2.

One aspect of the present invention provides a fuel dispenser display system that can generally be used as an easily adaptable solution to display and present information to be conveyed to the consumer as explained above. This information may include the cost per unit of volume of the type of fuel selected, the total volume of fuel dispensed, and the total cost of the dispensed fuel. It should be appreciated that the fuel dispenser display system may be configured to render graphics, images, or videos. For instance, FIG. 2 illustrates a fuel dispenser display system 130*a* that may be used as display 108 described above with respect to FIG. 1 or as part of display 108. Fuel dispenser display system 130*a* comprises at least one printed circuit board ("PCB") 132 having a frontward (user) facing side 134 and a rearward facing side 135 (FIG. 3).

Circuit board 132 comprises at least one thermal metallization element 136, which serves to receive, store, distribute, and/or convey heat energy. Thermal metallization elements 136 may be of any useful shape or distribution of shapes as to facilitate storage of heat energy and/or structured to limit heat loss. As illustrated in FIG. 2, multiple thermal metallization elements 136 may be stacked or layered in planes upon and/or within PCB 132 to facilitate storage of heat energy. Perpendicular and/or tangential structures, including vias either metallized or otherwise made thermally conductive, may also be used for thermal interconnection of thermal metallization elements.

Thermal metallization elements 136 may also serve as a path to convey electrical current, may possess electrical potential but not convey electrical current, may be electrically isolated, or may be electrically inert. In one embodiment, thermal metallization elements 136 are electrically unrestricted and may only optionally convey electrical current.

Fuel dispenser display system 130a also comprises at least one electrophoretic display device 128, which is bonded to or resides in proximate contact with PCB 132. More specifically, the active display pixels, segments, or other active display elements (hereinafter "active display portion") of electrophoretic display device 128 largely correspond with thermal metallization element 136 such that heat energy is conveyed from the thermal metallization element to the active display portion of electrophoretic display device 128.

In an embodiment where electrophoretic display device 128 is bonded to PCB 132 corresponding with thermal metallization element 136, the bonding adhesive is preferably thermally conductive, and/or may be physically or chemically modified to improve thermal conductivity and thus heat transfer from thermal metallization element 136 to electrophoretic display device 128.

Electrical interconnectivity between electrophoretic display device 128 and associated electrical conductors on the PCB may be accomplished by conventional methods, such as via at least one connector, metallurgic methods, such as soldering, or by an electrically conductive adhesive. Similarly, electrical interconnectivity between the electrophoretic display and associated electrical conductors on the PCB may be accomplished locally at electrophoretic display device 128, or proximate to or remotely from by electrically conductive appendage, cable, and/or ribbon. That is, it should be understood that there is no implied limitation regarding the physical relationship of electrophoretic display device 128 and where the electrical interconnectivity actually occurs with PCB 132, including the methodology of interconnection.

PCB 132 may also comprise at least one metallized or otherwise electrically conductive grouping or dispersion of interconnection pad(s) 138. In this embodiment, pads 138 correspond with at least one grouping or dispersion mating interconnection pad(s) 129 (FIG. 3) of electrophoretic display device 128. As a result, when electrophoretic display device 128 is in proximate contact with PCB 132, electrical interconnection is achieved between pads 138 and 129. To facilitate the electrical integrity of the interconnection, both interconnection pad(s) 138 and corresponding mating pad(s) 129 may comprise a non-oxidizing and/or non-reactive metal such as gold, as should be understood in the art.

LCD displays must be constantly driven with a time-variant waveform to maintain a given display state, present a capacitive electrical load, and therefore consume power in proportion to both the amplitude and frequency of the time-variant driving waveform. In contrast, electrophoretic display devices by their construct and nature require very little current and need only be driven once (pulsed) by a voltage of the proper polarity to achieve and maintain the desired display state. Therefore, electrophoretic display devices, such as device 128, are more tolerant of interconnection series impedance or other electrically resistive degradations as may be introduced by using a conductive adhesive as long as a sufficient time constant is allotted to permit the capacitive load to charge sufficiently. Those skilled in the art should appreciate that sufficient pulse duration for a resistive-capacitive network to largely achieve amplitude equivalency with respect and comparison to the driving pulse amplitude would be considered five time-constants, with a time-constant being defined as the resistive interconnection series impedance as measured and/or quantified in ohms as multiplied by driven electrophoretic display element's capacitance as measured and/or quantified in farads. Consequently, there is latitude in the choice of conductive adhesives for electrophoretic display interconnection, if used, as low electrical resistance is not mandatory. Lastly, with only a finite pulse duration required to achieve a given display state, no secondary and/or standby electrical energy source is therefore required to maintain that given display state in the event of power loss or failure. As noted above, display state preservation is often a requirement of jurisdictional weights and measures authorities for retail fuel dispensers.

The conductive adhesive may be applied in order to facilitate the electrical interconnection of pad(s) 138 on PCB 132 and corresponding mating pad(s) 129 on electrophoretic display device 128. It should be understood, however, that the conductive adhesive may also be electrically anisotropic in one or more favored axes, and thus applied more generally in scope. In fact, an electrically anisotropic adhesive may serve multiple functions, including, for instance, superficial electrical interconnection and the physical bonding of electrophoretic display device 128 to PCB 132 and/or the transfer of heat energy from thermal metallization element 136 to electrophoretic display device 128.

FIG. 3 is an exploded rear perspective view of fuel dispenser display system 130a. In this embodiment, display system 130a also comprises at least one component device 144 for generating heat energy, preferably by conversion from electrical energy. In this embodiment, heat generation component device(s) 144 are further bonded or proximate to a thermal metallization element 142 such that heat energy generated by component device(s) 144 is largely coupled and transferred to thermal metallization element 142. One example of heat generation component device(s) 144 is a heat producing transistor.

In this embodiment, with reference to both FIGS. 2 and 3, thermal metallization element 142 is further thermally coupled to thermal metallization element 136 by one or more vias 140, such that a useful amount of heat energy is conveyed from element 142 to element 136, and heat energy is thereby conveyed to electrophoretic display device 128. Vias 140 may comprise any useful thermally conductive path or material, perpendicular and/or tangential to the planes defined by elements 136 and 142. Preferably, vias 140 comprise metallic plated-through holes understood by those skilled in the art. Vias 140 may further be subjected to direct or reflow soldering during the manufacturing process so that the vias become largely filled with soldering metal, thus further enhancing their thermal conductivity, and therefore the thermal conductivity between thermal metallization elements 136 and 142.

Heat generation component device(s) 144 may be uncontrolled; that is, device(s) 144 may be operated at a fixed and constant output so that its thermal energy output is sufficient to maintain the minimal operationally desired temperature at electrophoretic display device 128 against the thermal losses of display system 130a when operated at a worst-case minimum fuel dispenser environmental temperature, typically −40° F.

Those skilled in the art should appreciate, however, that care must be exercised in the choice of a fixed and constant output such that, for a worst-case maximum fuel dispenser environmental temperature, the maximum operational or permitted temperature imposed upon electrophoretic display device 128 is not exceeded. Thus, in another embodiment, fuel dispenser display system 130a comprises at least one component device 146 for measuring heat energy as a temperature.

In one embodiment, temperature measurement device 146 may function as a simple thermostat, enabling heat generation component device(s) 144 at a minimum temperature threshold and conversely disabling heat generation component device(s) 144 at a maximum temperature threshold, with the two thresholds being separated to provide hysteresis. In an embodiment where heat generation component device(s) 144 are one or more heat generating transistors, for example, temperature measurement device 146 may be a simple PCB-mounted thermostat configured to activate and deactivate the transistors as desired. Temperature measurement device 146 may reside generally within the fuel dispenser, thus measuring ambient temperature as an indication that supplemental heat energy is required. Preferably, temperature measurement device 146 may alternatively be thermally coupled to heat generation component device(s) 144, which in turn is thermally coupled to electrophoretic display device 128. Thus, a more precise determination when supplemental heat energy is required at the point of need may be made. As illustrated in FIG. 3, for example, measurement device 146 may reside on thermal metallization 142, where it is in common with heat generation device(s) 144. It should be understood, however, that measurement device 146 may alternatively reside separate from but still thermally coupled or bridged to heat generation device(s) 144, such as on thermal metallization element 136, for instance.

In another embodiment, heat generation component device(s) 144 may be controlled or modulated as a function of the output of temperature measurement device 146 in order to achieve variable heat energy output of heat generation component device(s) 144. In this embodiment, heat generation component device(s) 144 are modulated either by amplitude modulation of a voltage or current, by pulse width modulation of a voltage or current, or a combination thereof. In such an embodiment, temperature measurement device 146 is also preferably bonded, common to, or thermally linked to heat generation component(s) 144 in order to facilitate the measurement of heat generation component(s) 144. As illustrated in FIG. 3, for example, measurement device 146 may reside on thermal metallization in common with heat generation device(s) 144. It should be understood, however, that measurement device 146 may alternately reside separate from heat generation device(s) 144 on thermal metallization element 136, for instance.

A single given temperature measurement device 146 may control or modulate one or more heat generation devices 144. Also, multiple temperature measurement devices, such as device 146, may likewise control various independent groups or groupings of heat generation devices 144 as desired.

As should be understood by those skilled in the art, and as described with respect to Laplace transform conventional notation, the transfer function, H(s), interposing the output of temperature measurement device 146 and the control or modulation heat generation device(s) 144, may be open loop; that is, without feedback. In this embodiment, over the full operational temperature range of the fuel dispenser, with consideration given to temperature extremes experienced both environmentally external to and internal within the cabinet of the associated dispenser (such as fuel dispenser 100 described above with respect to FIG. 1), the controlling and modulating output of H(s) is structured to be aggregately inversely proportional to temperature input to H(s) when evaluated over the entire temperature input span.

In a different embodiment, the transfer function, H(s), interposing the sum error (difference between) a desired temperature threshold and the output of temperature measurement device 146, and the control or modulation heat generation device(s) 144, may also be closed loop (i.e., with feedback). Furthermore, a feedback compensation function, G(s), may also interpose the output of temperature measurement device 146 and its contributive input to error summation, with G(s) serving to compensate for system thermal response time. Similarly within this embodiment, over the full operational temperature range of the fuel dispenser, with consideration given to temperature extremes experienced both environmentally external to and internal within the dispenser cabinet, the controlling and modulating output of H(s) is structured to be aggregately inversely proportional to temperature input to H(s) when evaluated over the entire temperature input span.

It should be understood that the output of H(s), with or without feedback, may be linear, non-linear, continuous, or discontinuous. It should be further understood that the output of H(s) is aggregately inversely proportional to temperature input when evaluated over the entire input span.

Figure 4:
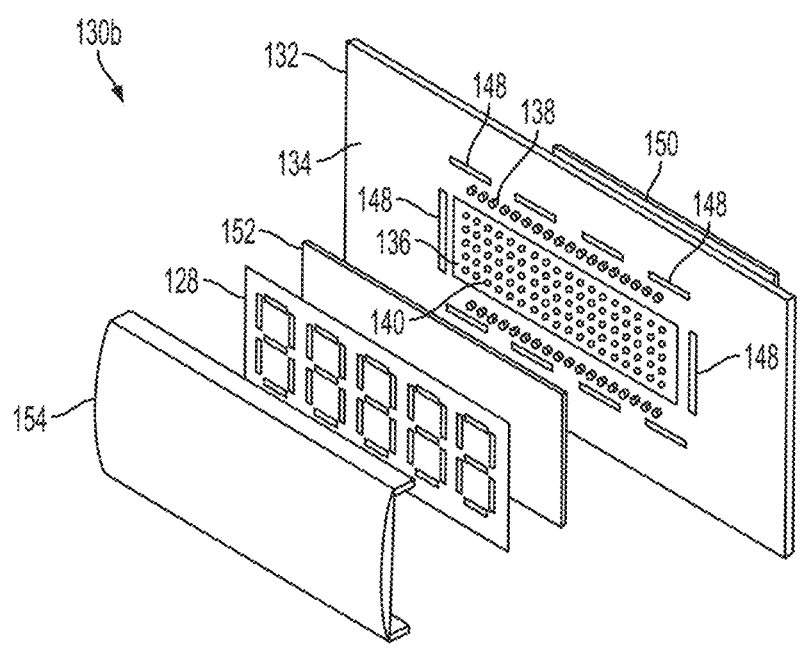
FIG. 4 is an exploded front perspective view of a fuel dispenser display system in accordance with an embodiment of the present invention.

FIG. 4 illustrates a fuel dispenser display system 130b, which may be used as display 108 described above with respect to FIG. 1 or as a part of display 108. Display system 130b includes the elements of display system 130a. In this embodiment, display system 130b may also comprise at least one thermal isolation barrier 148, achieved by removal of printed circuit board substrate material from PCB 132 adjacent or proximate to thermal metallization element 136 and thermal metallization element 142 (FIG. 5) in such manner that thermal energy stored within the thermal metallization elements has reduced propagation to surrounding substrate of circuit board 30 and/or other non-useful and/or dissipative or diluting thermal sinks. Thermal isolation barrier(s) 148 may be any useful shape or distribution of shapes as to provide thermal isolation.

Figure 5:
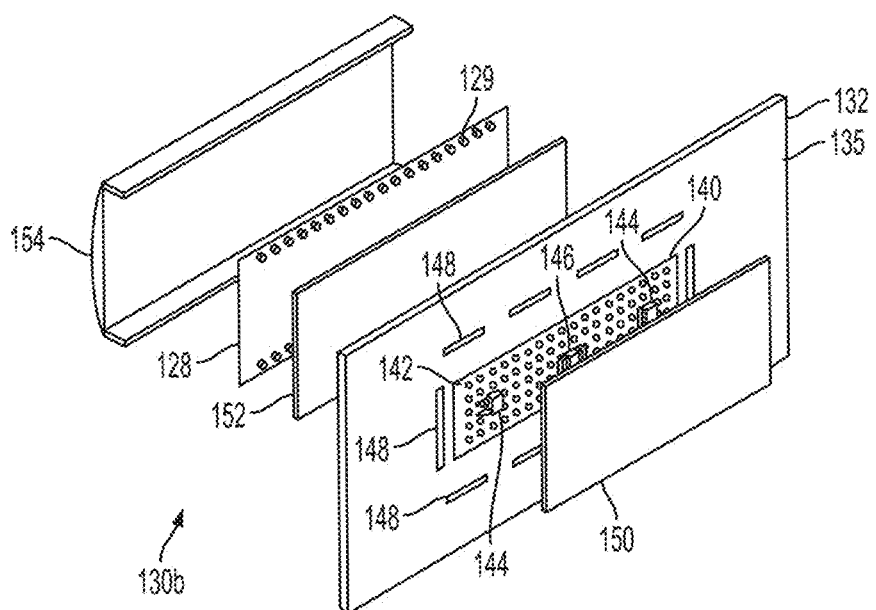
FIG. 5 is an exploded rear perspective view of the fuel dispenser display system of FIG. 4.

In this embodiment, display system 130b may also comprise at least one thermal insulation barrier 150, achieved by covering or ensconcing some or all of the thermal metallization elements of display system 130b otherwise exposed to ambient space and/or circulative air currents in such manner that the propagation of thermal energy stored within the thermal metallization elements to ambient losses via radiation and/or convection is reduced. As illustrated in FIGS. 4 and 5, for example, thermal insulation barrier 150 covers or ensconces thermal metallization element 142.

Those skilled in the art should appreciate that thermal insulation barrier 150 may be any useful shape or distribution of shapes as to provide thermal insulation.

Referring to FIGS. 4 and 5, display system 130*b* may also comprise at least one optically transparent thermal insulation barrier 154, achieved by partially or completely covering or ensconcing electrophoretic display devices(s) 128 otherwise exposed to ambient space and/or circulative air currents thereby reducing thermal energy losses of the electrophoretic display device(s) via radiation and/or convection. While complete coverage or ensconcement is desired for maximum insulative effect, partial coverage or ensconcement may also be employed to allow any water condensation to dissipate. It should be appreciated that optically transparent thermal insulation barrier 154 may be of a material, construction, additive, and/or dye such that attenuation occurs within the infrared portion of the electromagnetic spectrum.

In one embodiment, optically transparent thermal insulation barrier 154 may also be constructed to function as a light pipe, capturing ambient and/or artificial light, as radiated upon either frontward, rearward, and/or at various angles by design and construction, and redirecting such light as to illuminate electrophoretic display device 128 in addition to any direct illumination occurring largely tangential and/or perpendicular to optical transmissivity.

In one embodiment, the electrical interconnections between electrophoretic display device 128 and PCB 132 may also be accomplished by at least one electrically anisotropic gasket or membrane 152, either fully anisotropic in area, or limitedly anisotropic in specific area or areas where electrical interconnectivity is required. Gasket or membrane 152 may also be intrinsically thermally conductive and/or physically and/or chemically modified to improve thermal conductivity. Gasket or membrane 152 may also comprise an adhesive bonding area or areas, selectively or generally applied, to bond to either electrophoretic display device 128, PCB 132, or both.

Alternately, a physical retaining and/or compression device selectively or generally applying force normal to electrophoretic display device 128 may be used thereby compressing electrophoretic display device 128 against gasket or membrane 152 and gasket or membrane 152 against PCB 132. The compression device may be utilized in lieu of or in supplement to bonding. In one embodiment, for example, optically transparent thermal insulation barrier 154 may additionally serve as the physical retaining and/or compression device, thus compressing electrophoretic display device 128 against gasket or membrane 152 and compressing gasket or membrane 152 against PCB 132.

Those skilled in the art should understand that fuel dispensers are typically required to measure and display the volume of fuel dispensed in $\frac{1}{1000}^{th}$ (0.001) gallon increments as the least significant digit by industry standard and/or as mandated by jurisdictional weights and measures authorities. The maximum rate at which gasoline may be dispensed as permitted by the Environmental Protection Agency of the United States is currently ten (10) gallons per minute. At this rate, the least significant digit undergoes 167 changes per second. While the actual numerical value of the least significant digit is largely impossible to be humanly read at this rate of change, there is the perception nevertheless of change occurring; specifically, the perception that measurement is underway, and moreover of accuracy being maintained within the quanta represented by the least significant digit during high flow rate dispensing activity.

Electrophoretic mobility decreases with decreasing temperature, and, with it, the maximum possible dynamic refresh rate. If the maximum possible dynamic refresh rate is exceeded for high rate of change data, such as the aforementioned fuel volume dispensed least significant digit, it will tend to render to the human eye on a seven-segment display configuration as the numeral eight (8), thus unable to confer to the fuel dispenser user that measurement accuracy is being maintained during the dispensing activity.

Whereas electrophoretic mobility amelioration methods described herein reference segments within a seven-segment display embodiment, it should be understood that the description herein does not preclude or prohibit these methods being similarly applied to various electrophoretically implemented numerical, alphanumerical, and/or graphical display elements, and/or instructional, status, query, and/or prompt indicia.

Figure 6:
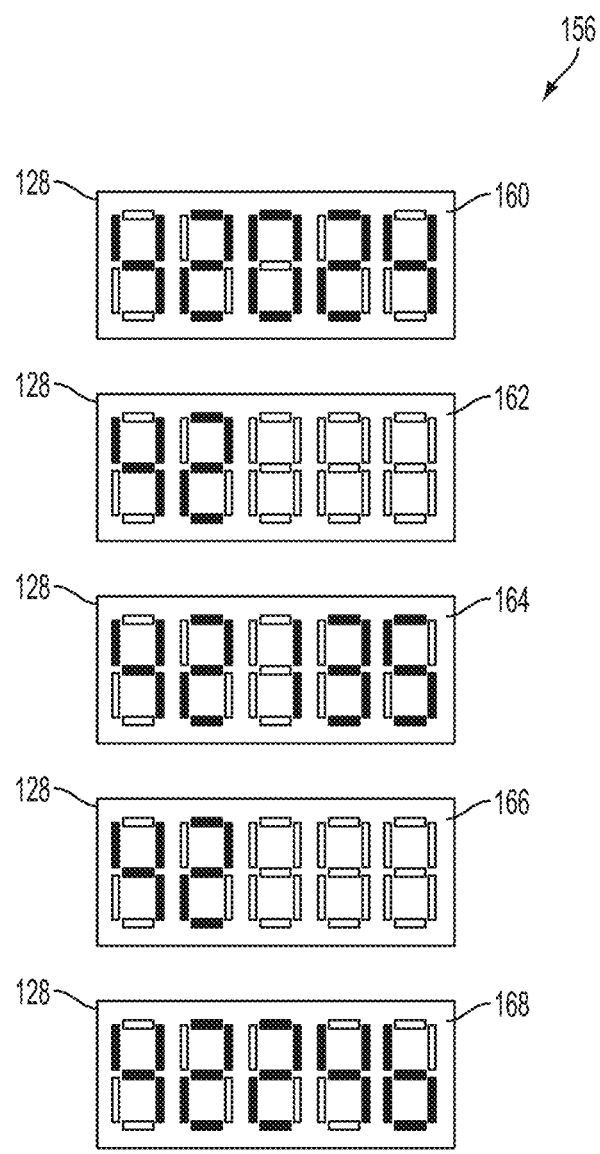
FIGS. 6 and 7 are exemplary sequences of display data rendered by a fuel dispenser display in accordance with embodiments of the present invention.

FIG. 6 illustrates an exemplary sequence 156 of data frames 160, 162, 164, 166, and 168 presented by electrophoretic display device 128. In one embodiment, transitions between those digits undergoing change on electrophoretic display device 128 are blanked before the rendering of the superseding digit. While superficially this may appear as a method to confer stroboscopic animation and thus the perception of change or activity on those digits undergoing frequent change, those skilled in the art should appreciate that doing such for stroboscopic purposes would effectively double the change rate and therefore be counterproductive. Instead, one aspect of the method described herein addresses the reduced electrophoretic mobility by issuing at least one additional blanking pulse to targeted segments of electrophoretic display device 128, thus further migrating and/or aligning pigmented particles suspended within the viscous dielectric dispersant. As a result, this prepares those affected digits for a new and uniform rendering, now with reduced or largely eliminated carry-over bias remaining as a function of prior segment state. For example, frame 160 depicts digits rendered upon electrophoretic display device 128, specifically "42024." Frame 162 depicts the three rightmost of those digits scheduled for change and those digits having been driven by at least one blanking pulse common to all segments to ameliorate prior state bias, while the two leftmost digits not scheduled for change may be left static or reinforced with appropriately appertaining pulse(s). Frame 164 depicts a new rendering by issuance of at least one pulse of appropriately appertaining polarity per segment, now displaying "42135." Frame 166 again depicts the three rightmost of those digits scheduled for change and having been driven by at least one blanking pulse, while the two leftmost digits not scheduled for change may again be left static, or reinforced with appropriately appertaining pulse(s). Frame 168 depicts another new rendering by issuance of at least one pulse of appropriately appertaining polarity per segment, displaying "42246."

Figure 7:
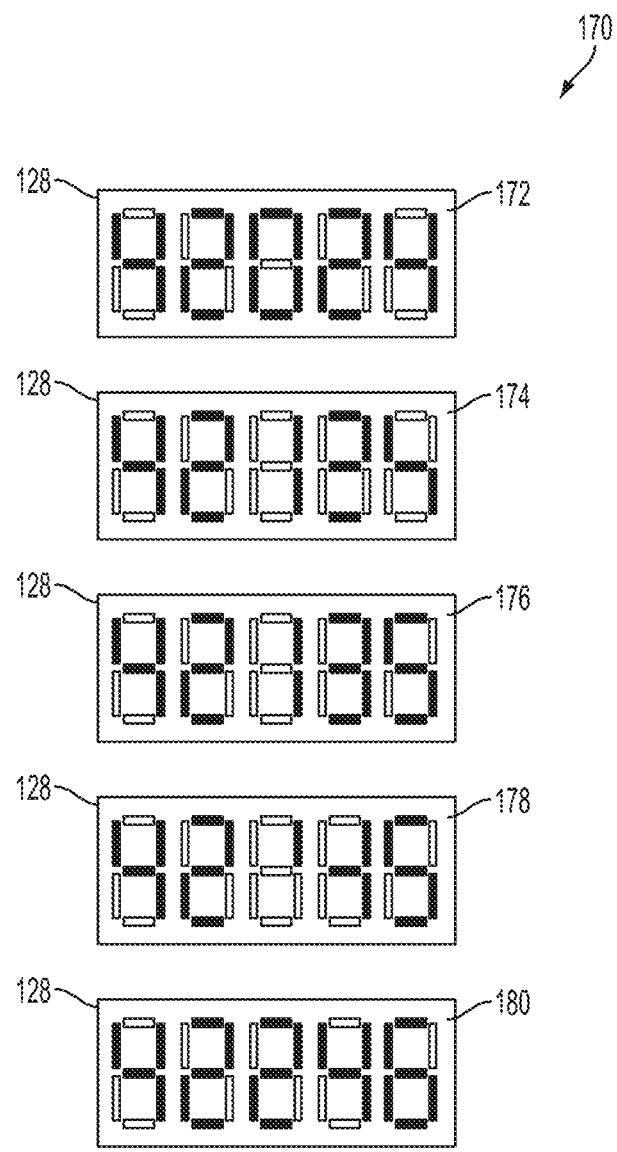

In another embodiment to ameliorate reduced electrophoretic mobility, transitions between those digits undergoing change on electrophoretic display device 128 are again blanked with at least one pulse before the rendering of the superseding digit. In this embodiment, however, only those segments required to transition to false, blank, or unpigmented are targeted, while true or presented segments may be left unaffected or have their state reinforced. For example, FIG. 7 illustrates an exemplary sequence 170 of data frames 172, 174, 176, 178, and 180 presented by electrophoretic display device 128 in such an embodiment.

In this embodiment, frame 172 depicts digits rendered upon electrophoretic display device 128, specifically "42024." Frame 174 depicts the three rightmost of those digits scheduled for change and those affected segments within those scheduled digits required to transition to false or blank having been driven by at least one blanking pulse to ameliorate prior state bias. True or presented segments remain unaffected or are reinforced true/pigmented, and the two leftmost digits not scheduled for change may be left static or may be reinforced with appropriately appertaining pulse(s). Frame 176 depicts a new rendering by issuance of at least one pulse of appropriately appertaining polarity per segment, now displaying "42135." That is, for example, the rightmost digit is a "4" in frame 172 and transitions to a "5" in frame 176. Via an intermediary step represented by frame 174, the top right bar of the "4" is blanked or transitioned to a false setting by an appropriate pulse applied to electrophoretic display 128. As a result, electrophoretic display 128 does not present that section of the digit as black or pigmented. Pulses are also applied to electrophoretic display 128 so that the top and bottom bars of the rightmost digit become true so that the display presents those sections as black or pigmented. As a result, the "4" is transitioned to a "5" via the use of a minimum amount of pulses.

Similarly, frame 178 depicts the three rightmost digits scheduled for change and the affected segments within those scheduled digits required to transition to false or blank having been driven by at least one blanking pulse to ameliorate prior state bias. True or presented segments of the digits may be left unaffected or reinforced true, and the two leftmost digits not scheduled for change may be left static or may be reinforced with appropriately appertaining pulse(s). Frame 180 depicts another new rendering by issuance of at least one pulse of appropriately appertaining polarity per segment, displaying "42246." Thus, it should be understood that the portions of electrophoretic display 128 to which a pulse must be applied in order to display the desired information is minimized.

Generally, the maximum numeric display data rate allowing for human comprehension and/or a cognitive response thereto is approximately five (5) presentations or renderings per second. It is sufficient, however, to convey the perception that measurement is underway for a fuel dispenser and, more specifically, for the least significant digit of the volume dispensed. Moreover, it is sufficient to maintain accuracy within the quanta represented by the least significant digit by dynamic appearance, as when dispensing is interrupted or completed, so that those values necessary for commerce will render and remain static. Consequently, the actual refresh rate, defined as the numeric groupings sequentially presented to the display to likewise be rendered as a common numerical group, need only exceed by specifiable margin the electrophoretic dynamic refresh rate as limited by electrophoretic mobility. Therefore, if implemented independently or in tandem with the bias amelioration methods presented herein, a maximum possible display refresh rate for purposes of fuel dispensing is yielded.

Figure 8:
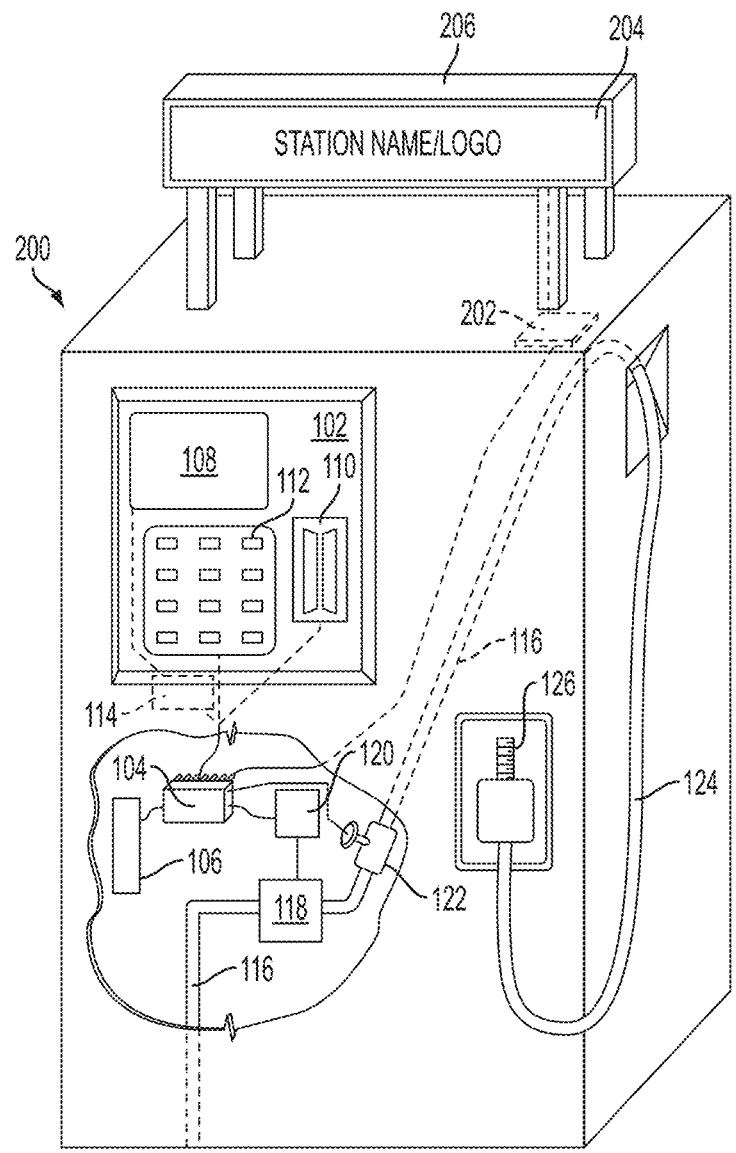
FIGS. 8 and 9 are partially schematic, perspective views of fuel dispensers in accordance with embodiments of the present invention.

FIG. 8 is a partially schematic, perspective view of a fuel dispenser 200 that is similar in both construction and operation to fuel dispenser 100 of FIG. 1. Fuel dispenser 200, however, comprises an additional electric source 202 operatively connected to an additional electrophoretic display 204. Processing device 104 is operatively connected to electric source 202 in a manner similar to that described above with respect to electric source 114. That is, processing device 104 is configured to transmit data to electric source 202 representative of one or more images to be presented by electrophoretic display 204. Accordingly, electric source 202 is configured to construct and then apply electric fields to the particles of electrophoretic display 204, thereby causing the display to present the image(s).

In this embodiment, electrophoretic display 204 is positioned to overlay a marquee, canopy, or signboard 206 of fuel dispenser 200. As a result, dispenser 200 is able to present an image, which may include the name, brand, and/or logo of the entity responsible for the fuel station, on signboard 206. It should be understood that the image presented by signboard 206 may be dynamically changed by the data transmitted to electric source 202. For instance, should ownership of the fueling environment in which dispenser 200 is located change, signboard 206 may be changed by transmitting the appropriate information to electric source 202 via processing device 104.

Figure 9:
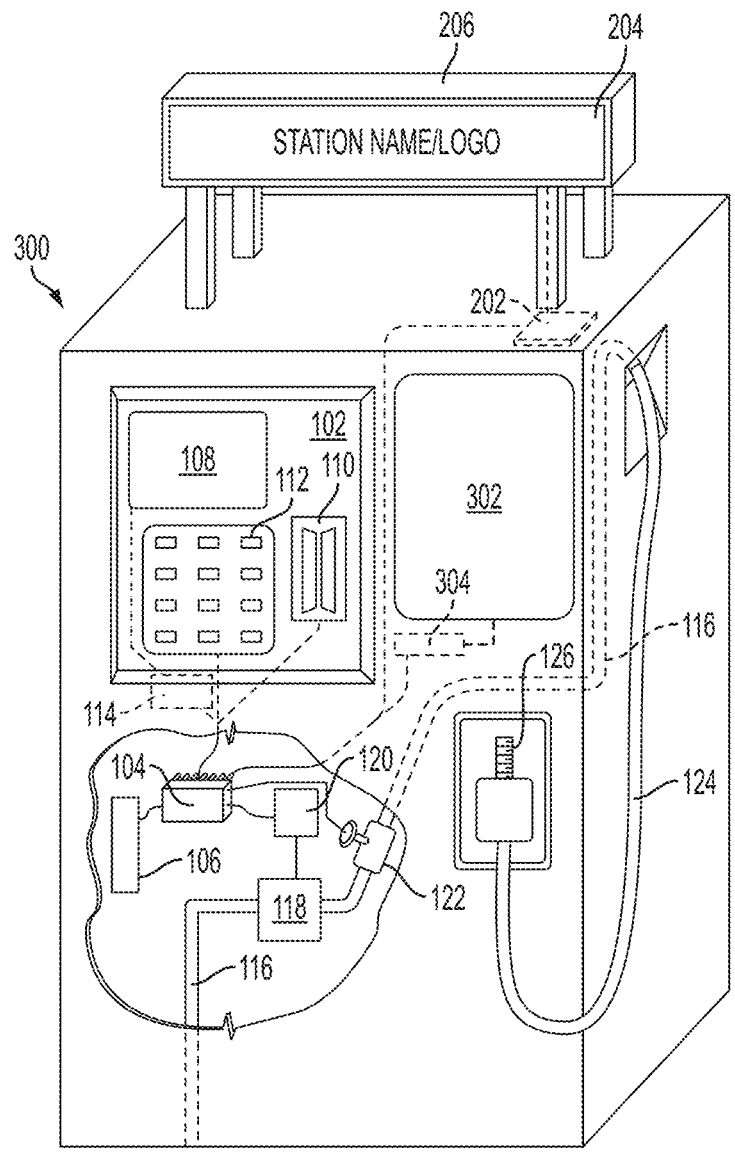

From the above description, it should be understood that a dispenser, such as dispensers 100 and 200, may include any number of electrophoretic displays and electric sources in order to present information via the dispenser. Referring to FIG. 9, for instance, a dispenser 300 comprises an additional electrophoretic display 302 and an electric source 304 operatively connected to processing device 104. Dispenser 300 is otherwise similar in construction and operation to dispenser 200 (FIG. 8). Electrophoretic display 302 and electric source 304 are constructed and operate similarly to electrophoretic displays 108 and 204 and electric sources 114 and 202, respectively, as described above with regard to FIGS. 1 and 8. That is, electric source 304 creates and applies electric fields to the particles of electrophoretic display 302 in order to present an image based on data received from processing device 104.

It should be understood that processing device 104 may transmit data representative of any desired image to be presented by electrophoretic display 302. For instance, electrophoretic display 302 may present advertisements for a nearby restaurant or for beverages sold at a convenience store located within the fueling environment. It should be further understood that the data may be configured so that electrophoretic display 302 cycles through and displays multiple advertisements during a refueling process initiated by a customer.

It should also be understood that dispenser 300 may comprise additional electrophoretic displays. In one embodiment, for example, a large portion of fuel dispenser 300 may be covered with one or more electrophoretic displays in order to display information and/or advertisements. In one embodiment, sequential images are presented on a side of dispenser 300 via an electrophoretic display to present a moving graphic, image, or logo associated with the entity responsible for the fueling environment.

In another embodiment, an area of fuel dispenser 300 may be covered by multiple electrophoretic displays located adjacent one another. The multiple displays are operatively connected to either a single electric source or to multiple sources configured to operate in conjunction with one another. This allows the electrophoretic displays to work together to present an image that covers more than one of the electrophoretic displays. It should be understood that such a configuration may be used to present an image over an area greater than that occupied by a single electrophoretic display while allowing smaller, more economical electrophoretic displays to be used. It should be understood that the selection, processing, and transmission of data to the electric source(s) is accomplished by processing device 104 in order to present an image via the multiple electrophoretic displays. The ability to display a single image over multiple displays located on fuel dispenser 300 may be useful during periods of time when the dispenser is not operational, is not currently being used, or during non-peak hours. For instance, during a refueling process, electrophoretic display 108 may present material relevant to the refueling process, such as a total amount of fuel dispensed, while electrophoretic display 302 may display advertisements. When not in use, electrophoretic displays 108 and 302 and the additional displays described above may be used to display a logo associated with the dispenser's operator or a general advertisement over a majority of fuel dispenser 300.

Figure 10A:
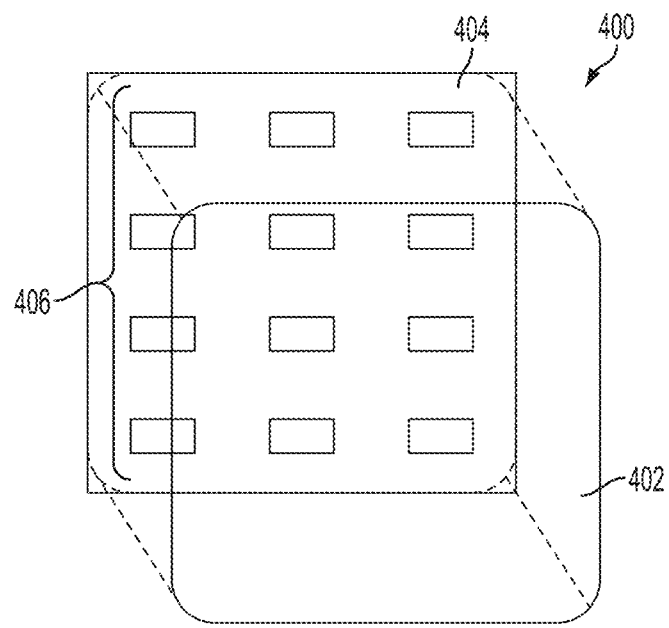
FIGS. 10A and 10B are partially schematic representations of an exemplary user interface in accordance with an embodiment of the present invention.

FIG. 10A illustrates a user interface 400 comprising an electrophoretic display 402 positioned over a keypad 404. In this embodiment, keypad 404 may be a soft matrix, membrane keypad, pressure pad, dome-switch keyboard, or any other suitable device configured to output data identifying which portion of the keypad has been selected. As should be understood, keypad 404 comprises a plurality of buttons, pressure sensors, or soft keys 406. Electrophoretic display 402 is configured to present an image and is operatively connected to a processing device via an electric source in a manner similar to that described above with respect to electrophoretic displays 108, 204, and 302 shown in FIG. 9. Keypad 404 is also operatively connected to a processing device, such as processing device 104 (FIGS. 1, 8, and 9), and is configured to output data to the processing device identifying a specific soft key each time the soft key is selected.

Figure 10B:
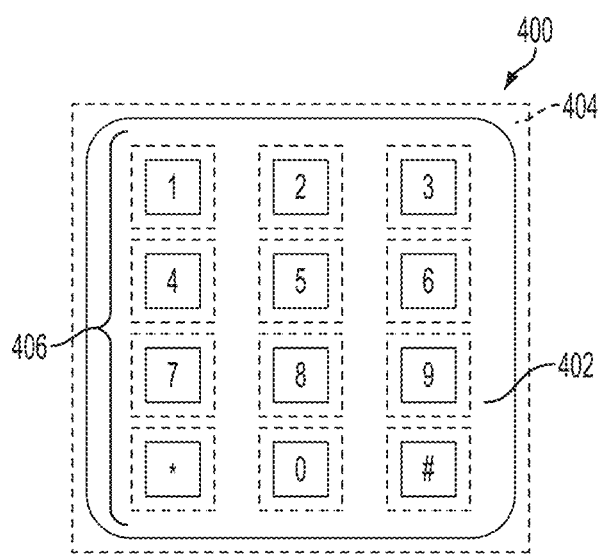

FIG. 10B illustrates user interface 400 presenting an image via electrophoretic display 402 representative of a numeric keypad. In the presently-described embodiment, each soft button 406 of keypad 404 corresponds to a portion of the image displayed by electrophoretic display 402 representative of a number. In operation, a customer depresses a portion of electrophoretic display 402 and keypad 404 corresponding to a number shown in the image presented by the display. Keypad 404 transmits data to the processing device representative of which soft key was selected. The processing device determines the number selected by the customer based on the data transmitted by keypad 404 identifying which of soft keys 406 was selected.

It should also be understood from the above description that electrophoretic display 402 may be configured to present any suitable image. Accordingly, electrophoretic display 402 may present instructions or advertisements to a customer during a fueling process and/or may present a virtual keypad or PIN pad when the customer's PIN is requested. It should further be understood that user interface 400 may be used to replace electrophoretic display 108 and keypad 112 of FIG. 1.

Figure 11A:
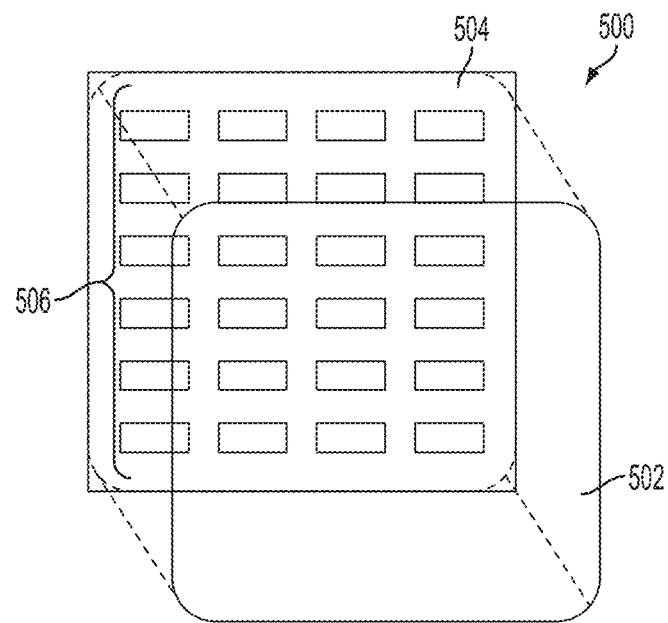
FIGS. 11A and 11B are partially schematic representations of an exemplary user interface in accordance with an embodiment of the present invention.

FIG. 11A illustrates a user interface 500 comprising an electrophoretic display 502 positioned over a keypad 504 in a manner similar to that described above with respect to user interface 400 of FIG. 10A. In this embodiment, however, keypad 504 includes a greater number of soft keys in comparison to keypad 404. In operation, electrophoretic display 502 presents an image based on electric fields applied to the display's particles by an electric source in response to data received by the source from a processing device. Data representative of the identification of a specific key of soft keys 506 is transmitted to the processing device by keypad 504 when the key is selected by a customer.

Figure 11B:
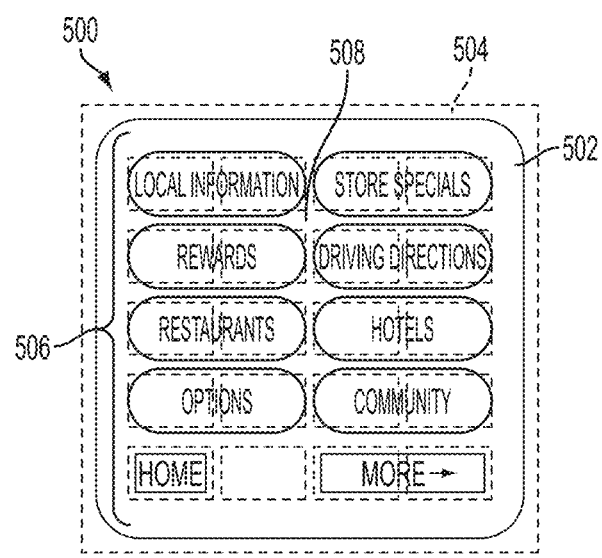

FIG. 11B illustrates user interface 500 presenting an image via electrophoretic display 502 representative of a graphical user interface ("GUI") 508 presented to a customer during a fueling process. In the presently-described embodiment, GUI 508 presents various options to the customer. As illustrated in FIG. 11B, each option corresponds with at least one soft key and may correspond to multiple soft keys 506. When a soft key is selected by the customer, keypad 504 transmits data identifying the selected soft key to the processing device, which determines the option selected by the customer based on the transmitted data. Depending on the option, electrophoretic display 502 may display additional options to the customer, may present the customer with the requested information, or may perform additional processing as necessary or desired. For instance, should a customer select a soft key associated with a "Hotel" option, the processing device may retrieve a list of nearby hotels for presentation as another GUI to the customer.

It should be understood that user interface 500 may be used to present any suitable GUI, menu, or selectable options to a customer and handle the customer's responses. For instance, user interface 500 may also be configured to present a virtual PIN pad in a manner similar to that described above with respect to user interface 400. In one embodiment, for instance, user interface 500 is configured to provide a virtual pin pad as disclosed in copending U.S. patent application Ser. No. 12/695,692 entitled "Virtual Pin Pad for Fuel Payment Systems" filed on Jan. 28, 2010, the entire disclosure of which is incorporated by reference for all purposes as if set forth verbatim herein.

Figure 12:
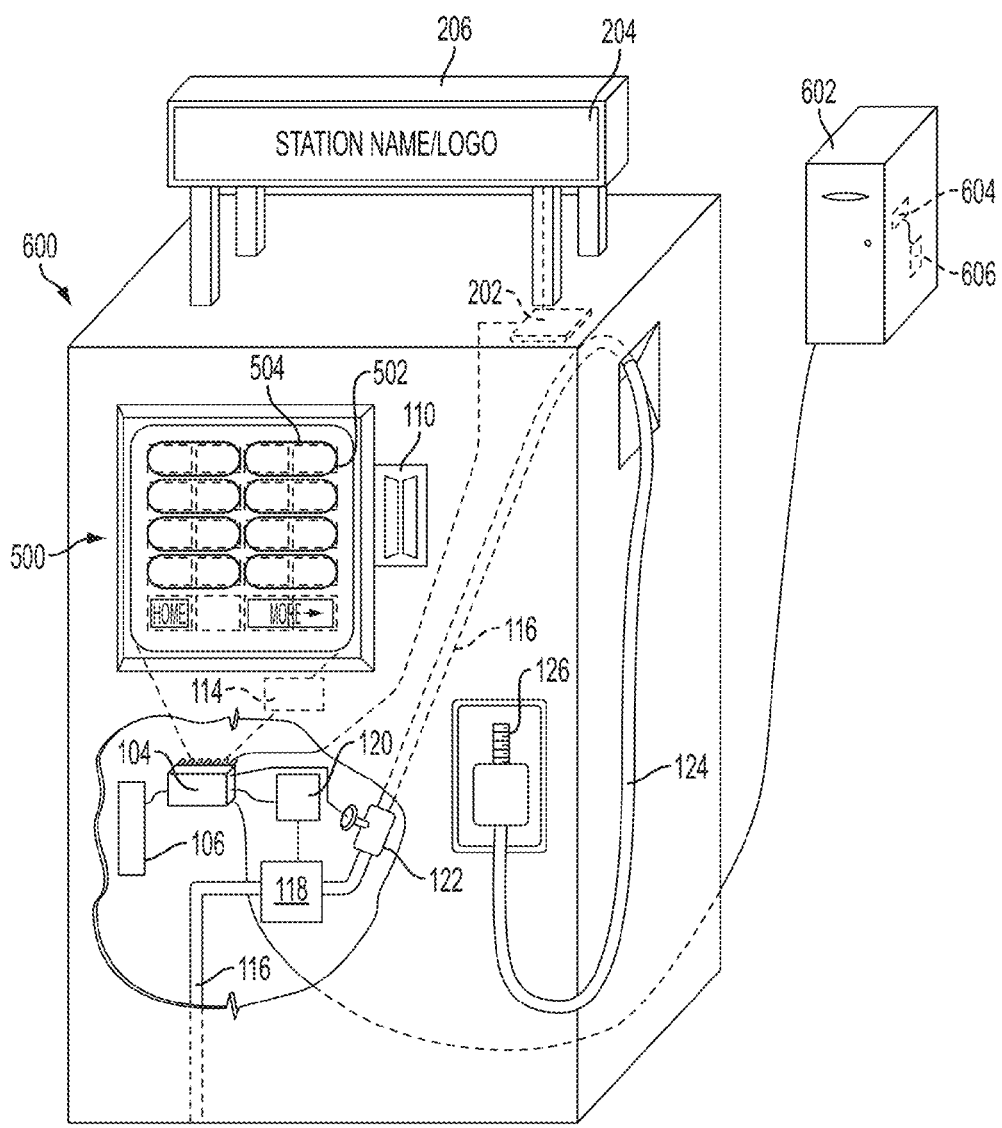
FIG. 12 is a partially schematic, perspective view of a fuel dispenser including the exemplary user interface of FIGS. 11A and 11B in accordance with an embodiment of the present invention.

In one embodiment, a fuel dispenser comprising at least one electrophoretic display is operatively connected to a server configured to transmit data to the dispenser representative of the images to be presented by the electrophoretic display. Referring to FIG. 12, for instance, a dispenser 600 is operatively connected to a server 602 comprising its own processing device 604 and memory 606. In this embodiment, electrophoretic display 108 and keypad 112 of dispenser 100 (FIG. 1) are replaced in fuel dispenser 600 with user interface 500 comprising electrophoretic display 502 and keypad 504 that are described above with respect to FIGS. 11A and 11B. Processing device 604 and memory 606 may be any suitable devices such as the devices described above with respect to processing device 104 and memory 106, respectively, of FIG. 1.

In one embodiment, server 602 is located within a central facility, such as a convenience store, of the same fueling environment in which dispenser 600 is located and is operatively connected to the dispenser via a local area network ("LAN"). Alternatively, server 602 may be located remotely with regard to dispenser 600 and operatively connected to the dispenser via a wide area network ("WAN"), such as the Internet. In yet another embodiment, server 602 is operatively connected to dispenser 600 via one or more WANs, LANs, cellular networks, routers, dispenser hubs, and/or other devices, as should be understood in the art. The connection between dispenser 600 and server 602 may be wired, wireless, or a combination of the two. It should be understood that server 602 may be operatively connected to all the dispensers located within a fueling environment and may be operatively connected to multiple fueling environments.

In operation, data representative of the images to be displayed via electrophoretic displays 502 or 204 is stored in memory 606. The data is transmitted by processing device 604 to fuel dispenser 600 and stored in memory 106 by processing device 104 until needed. In one embodiment, the data includes an identification of the electrophoretic display on which the corresponding image should appear in a scenario where the dispenser comprises multiple displays. Processing device 104 retrieves at least a portion of the data from memory 106 and transmits it to the appropriate electric source. The process then continues in a manner similar to that described above in order for the respective electrophoretic display to present the corresponding image.

In one embodiment, memory 606 includes instructions that, when executed by processing device 604, provide a GUI configured to allow a user to select, manipulate, and/or design various text, information, and graphics to be displayed as an image by an electrophoretic display. Once a user selects and formats the desired material using the GUI, data representative of the image is stored in memory 606. At the appropriate time, processing device 604 retrieves the data from memory 606 and transmits it to the selected fuel dispenser, such as dispenser 600, in the manner described above.

It should be understood from the above description that server 602 may be used in order to create and present any material to be displayed as an image by a chosen electrophoretic display. It should also be understood that the material may be altered or updated and retransmitted to the dispenser using the GUI in order to alter or update the images presented by the respective electrophoretic displays.

Due to the relatively low cost of electrophoretic displays and pressure-sensitive keypads, a fuel dispenser, such as dispenser 300 (FIG. 9), may comprise one or more additional user interfaces, similar in construction and operation to user interfaces 400 or 500. For instance, electrophoretic display 302 may be replaced with such a user interface in order to allow a customer to interact with the fuel dispenser to receive information ancillary to the fueling process, such as driving directions, while using another, separate user interface to provide information to the dispenser corresponding to the fueling process, such as payment information.

In one embodiment, for example, information and GUIs provided by parties other than the fuel dispenser's operator may be presented on a first such user interface only, while information and GUIs provided by the operator are presented via another user interface. Notice may be provided to any customer that the operator does not provide and is not responsible for material presented via the first user interface. As a result, the customer is forewarned that any material presented via the first user interface, such as an unauthorized GUI presenting a keypad and requesting the customer's PIN, is not authorized by the operator. Fraudulent attempts to elicit confidential information from the customer may be reduced in this manner.

It should be understood by those skilled in the art that a user may interact with the GUIs displayed by user interface 500 and the additional electrophoretic display and keypad seemingly simultaneously. In fact, each pair of electrophoretic displays and keypads may be operatively connected to separate computers or processing devices, thereby allowing the respective computer to separately manage the electrophoretic display, the keypad, and the user's interaction therewith. That is, each pair may be associated with its own resources allowing separate processes, tasks, and interactions to be accomplished by the pair. For instance, the additional electrophoretic display and keypad may be operatively connected to a travel service provider allowing a user to purchase travel-related items, such as airline or concert tickets, while refueling his or her vehicle. In this example, user interface 500 is operatively connected to processing device 104 in order to display material relevant to the refueling process, such as total amount of fuel dispensed. The additional electrophoretic display and keypad are operatively connected to another computer, such as server 602, in order to send and receive information, such as travel-related information, which may be accomplished via processing device 104.

Those skilled in the art should understand that embodiments of the present invention provide a system and method that presents selectable options to a user via a user interface 500 comprising electrophoretic display 502 and keypad 504. As a result, a user is able to select a desired option from the GUI presented by fuel dispenser 600. Use of such an electrophoretic display and keypad reduces both the manufacturing and operational costs of a fuel dispenser. Components accompanied by greater initial and operational costs, including LCDs, keypads, touchscreens, and battery backups, are no longer necessary. Additionally, electrophoretic displays are easier to view than LCDs and other displays that require backlighting to function.

It should also be understood that electrophoretic displays only require energy to alter the image presented by the display and that the amount of electric power required to create and apply the electric charge needed to present the image is substantially less than the amount of continuous power needed to operate a tube or display incorporating vanes, filaments, cathode rays, LEDs, or liquid crystals. The above description, therefore, discloses a system and method for displaying information at a fuel dispenser that requires a comparatively reduced amount of energy.

It should be further understood that the above explanation describes a system and method for retaining the information displayed at a fuel dispenser in the event of a power failure without the need for additional components, such as capacitors or battery backups. The relatively large capacitors that have been incorporated into some fuel dispensers in order to provide a sufficient amount of power to retain the information presented by the fuel dispenser in an event of power failure are no longer necessary.

Those skilled in the art should appreciate that an electrophoretic display may be utilized by other components in a fueling environment where it is desirable or necessary to retain information for a predefined amount of time or in the event of a power failure. For instance, a component configured to monitor and display certain measurements of characteristics of another device may comprise an electrophoretic display. The component may be configured so that the measurements or characteristics are presented via the electrophoretic display. Thus, in the event of a power failure, the measurements remain visible via the electrophoretic display in a manner similar to that described above.

For example, certain standards may require information corresponding to the most recent fueling transaction completed by a customer, the levels of fuel in an UST, and/or the amount of fuel received from the UST corresponding to the most recent fueling transaction to be viewable for a predefined amount of time. The component displaying the information typically presents the information via a conventional display and comprises additional devices configured to provide the display with a sufficient amount of power to present the information for the predefined amount of time even in the event of a power failure, such as a battery backup or relatively large capacitors. In one embodiment of the present invention, the display and additional devices included within such a component are replaced with an electrophoretic display. In the event of a power failure, the required information remains viewable due to the use of the electrophoretic display, in a manner similar to that explained above.

In many developing countries, for instance, electric power is inconsistent and unreliable. This unpredictability creates challenges for industries and equipment that require electricity to operate, including fuel dispensers and other equipment within a fueling environment. During a power outage, the equipment itself, as well as any electronically-driven site parameter tracking systems, become unusable without a secondary power source. Electrophoretic displays eliminate the need for a secondary power source to retain the last image on a display screen prior to a power outage. For example, the display could be used in a tank monitoring system to display tank levels or other monitored parameters for the site owner/employees. In the event of power outage, the image on the display will remain indefinitely until power is restored. Alternatively, since electrophoretic displays require such low power levels to operate, a small battery could be used to run the screen and update system information if available during the power outage.

Thus, an electrophoretic display could be used as any other display, with input from various systems, showing parameter values on the display that could be updated at any preferred rate. In the case of power failure, the last image displayed on the screen would remain for the entire power outage, allowing valuable data to be collected. One use of this could be to compare pre-outage information to post-outage information, to determine whether theft occurred during the power loss, in the case of monitoring tank levels. Additionally, with the use of a small battery to drive the display, information gathered from passive equipment, such as tank temperature thermocouples, could update on the display, allowing for monitoring to continue during the outage. Also, an electrophoretic display causes less strain to the viewers' eyes than other display types.

It should additionally be understood that the above description discloses a system and method for facilitating information to be displayed at a fuel dispenser. Referring to FIG. 12, for instance, data corresponding to a name, image, or logo merely needs to be provided to processing device 104 in order to change the image presented by signboard 204. As a result, the operator of the corresponding fueling environment may change the logo and name appearing on the fuel dispenser relatively quickly and easily. This may be accomplished from a computer within the fueling environment operatively connected to the fuel dispenser or may even be done from a remote location. For example, a proprietor of multiple fueling stations may change the signboard of multiple dispensers by altering the data corresponding to the image to be displayed by the signboards and instructing server 602 to transmit the data. The proprietor only needs to alter and transmit the data once in order to change all the signboards of fuel dispensers operatively connected to server 602.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fuel dispenser comprising:
   a meter configured to measure a flow of fuel;
   a heat measuring device;
   a processing device operatively connected to the meter; and
   a first electrophoretic display positioned on the fuel dispenser and configured to display a first image based on first data transmitted by the processing device corresponding to the flow of fuel measured by the meter, wherein the first electrophoretic display is in thermal communication with a printed circuit board including at least one thermal metallization element;
   wherein the first data remains displayed during a power failure to the fuel dispenser.

2. The fuel dispenser of claim 1 further comprising a pulser configured to transmit a signal representative of the flow of fuel measured by the meter, wherein at least a portion of the first data transmitted by the processing device corresponds to the signal.

3. The fuel dispenser of claim 1 further comprising an electric source operatively connected to the processing device and configured to apply at least one electric field to a plurality of particles of the first electrophoretic display in order to cause the first electrophoretic display to display the first image based on the first data transmitted by the processing device.

4. The fuel dispenser of claim 3 wherein the first electrophoretic display comprises the electric source.

5. The fuel dispenser of claim 1 further comprising a second electrophoretic display operatively connected to the processing device and configured to display a second image based on second data transmitted by the processing device.

6. The fuel dispenser of claim 5 wherein the second data corresponds to an advertisement to be presented as the second image.

7. The fuel dispenser of claim 1 wherein the electrophoretic display is configured to display a second image based on second data transmitted by the processing device received from a remote server.

8. The fuel dispenser of claim 7 wherein the second data corresponds to the first image, and the remote server is configured to allow for creation of the second data.

* * * * *